United States Patent
Nishida et al.

(10) Patent No.: US 10,884,711 B2
(45) Date of Patent: Jan. 5, 2021

(54) CODE MANAGEMENT SYSTEM AND CODE MANAGEMENT METHOD USING A VISUAL PROGRAMMING TOOL

(71) Applicant: Hitachi, Ltd., Tokyo (JP)

(72) Inventors: Toshio Nishida, Tokyo (JP); Junji Kinoshita, Tokyo (JP); Keisuke Hatasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/574,833

(22) Filed: Sep. 18, 2019

(65) Prior Publication Data

US 2020/0241850 A1 Jul. 30, 2020

(30) Foreign Application Priority Data

Jan. 30, 2019 (JP) .................................. 2019-014910

(51) Int. Cl.
*G06F 8/34* (2018.01)
*G06F 8/75* (2018.01)
*G06F 8/36* (2018.01)

(52) U.S. Cl.
CPC .................. *G06F 8/34* (2013.01); *G06F 8/75* (2013.01); *G06F 8/36* (2013.01)

(58) Field of Classification Search
CPC .................. G06F 8/34; G06F 8/36; G06F 8/75
USPC .................................................. 717/106–113
See application file for complete search history.

(56) References Cited

U.S. PATENT DOCUMENTS

| 6,683,624 | B1 * | 1/2004 | Pazel | G06F 8/34 |
| | | | | 345/619 |
| 2017/0153886 | A1 * | 6/2017 | Singh | G06F 8/70 |
| 2020/0097262 | A1 * | 3/2020 | Lodhia | G06F 8/36 |
| 2020/0097263 | A1 * | 3/2020 | Lodhia | G06N 20/00 |
| 2020/0097266 | A1 * | 3/2020 | Lodhia | G06F 8/36 |

FOREIGN PATENT DOCUMENTS

JP 5-119989 A 5/1993

OTHER PUBLICATIONS

Heath, Nick, "How IBM's Node-RED is hacking together the internet of things," <https://www.techrepublic.com/article/node-red/>, Mar. 13, 2014, p. 1-15. (Year: 2014).*

* cited by examiner

*Primary Examiner* — Qing Chen
(74) *Attorney, Agent, or Firm* — Crowell & Moring LLP (57) ABSTRACT

The convenience of reusing software generated by a visual programming tool is further improved. A code management system includes a flow generation unit that creates a process flow based on user manipulation and generates code based on the created process flow, a flow management unit that saves the code generated by the flow generation unit, a code acquisition unit that acquires code in response to the code being saved in the flow management unit, a code conversion unit that converts the code acquired by the code acquisition unit to a process flow diagram, a flow image generation unit that generates a flow image of the process flow diagram converted by the code conversion unit, and a flow image registration unit that registers the flow image generated by the flow image generation unit in the flow management unit in association with the code prior to conversion to the process flow diagram by the code conversion unit.

6 Claims, 11 Drawing Sheets

```
{
    "id": "7c37c97f.854318",
    "type": "tab",
    "label": "Main Flow",
    "disabled": false,
    "info": ""
},
{
    "id": "cc376376.f062a",
    "type": "tab",
    "label": "Sub Flow 1",
    "disabled": false,
    "info": ""
},
{
    "id": "1058af4.689b351",
    "type": "tab",
    "label": "Sub Flow 2",
    "disabled": false,
    "info": ""
},
```

CODE MANAGEMENT SYSTEM AND CODE MANAGEMENT METHOD USING A VISUAL PROGRAMMING TOOL

TECHNICAL FIELD

The present invention relates to a code management system and a code management method.

BACKGROUND ART

Programming tools include visual programming tools that enable software to be developed by describing model diagrams without writing source code. One such example is Node-RED. In software development that uses visual programming tools, information corresponding to the intended use, the environment and other circumstances is configured as attribute values (properties) for nodes represented by various processes, and a series of processes are described as a flow each time nodes are wired together. By using such visual programming tools, software developers are able to develop software for performing intuitively designed processes even without adequate knowledge of software development.

Furthermore, in the software development field, there are endeavors to shorten development periods by frequently reusing code. In such cases, reusable code is shared using tools known as code management tools such as GitHub and GitLab. Software developers are able to develop software for which existing code is reused by acquiring any code from code management tools.

By reusing code shared using code management tools and so forth in this way, software developers are then able to carry out software development efficiently without needing to develop software from scratch. The same is also true for development using visual programming tools.

However, software that has been developed using a visual programming tool is still registered and managed as source code via a code management tool. For example, a series of flows that have been developed via Node-RED is managed using code in a format based on a JavaScript (registered trademark) programming language known as JSON (JavaScript (registered trademark) Object Notation). Therefore, even for development using a visual programming tool, when existing code is reused in the development, an understanding of code in the JSON format that has been registered for reuse is required, and hence there is a need to find a way of making one's own software development more efficient. This is difficult work for a developer with inadequate knowledge of software development. Moreover, even for a developer who is well versed in software development, the steps of reading code and searching for reusable code represent a large overhead in software development.

In this regard, PTL 1 discloses a method that enables a program specification to be easily understood even without knowledge of the programming language by analyzing logic information of the program and outputting this information as a flowchart.

CITATION LIST

Patent Literature

[PTL 1] Japanese Unexamined Patent Application Publication No. H5-119989.

SUMMARY OF THE INVENTION

Problems to be Solved by the Invention

In visual programming tools including Node-RED, because nodes representing the various processes are arranged and a series of processes is described each time nodes are wired together, the location of each node is also important information in terms of visibility and so forth. However, in the method disclosed in PTL 1, such information is missing, which impairs the convenience of reusing software generated by means of a visual programming tool.

Therefore, in view of the foregoing points, it is an object of the present invention to further improve the convenience of reusing software generated by means of a visual programming tool.

Means to Solve the Problems

To solve this problem, the present invention is, for example, a code management system including a visual programming tool that creates a process flow by wiring together nodes representing processes, comprising a flow generation unit that creates a process flow based on user manipulation and generates code based on the created process flow; a flow management unit that saves code generated by the flow generation unit; a code acquisition unit that acquires code in response to the code being saved in the flow management unit; a code conversion unit that converts code acquired by the code acquisition unit to a process flow diagram; a flow image generation unit that generates a flow image of the process flow diagram thus converted by the code conversion unit; a flow image registration unit that registers the flow image generated by the flow image generation unit, in the flow management unit in association with the code prior to conversion to the process flow diagram by the code conversion unit.

Advantageous Effects of the Invention

According to the present invention, it is possible to further improve the convenience of reusing software generated by means of a visual programming tool.

Problems, configurations and effects other than those described hereinabove will become more apparent from the description of the embodiments hereinbelow.

DESCRIPTION OF EMBODIMENTS

Embodiment examples which are incorporated in the embodiment of the present invention will be described in detail hereinbelow based on the drawings. In each of the drawings which serve to illustrate the embodiment examples hereinbelow, the same reference numbers denote the same or similar configurations or processes, and a subsequent description thereof is not included. In the subsequent description of the embodiment examples, only those parts which differ from those of preceding embodiment example descriptions will be described. In addition, each of the embodiment examples and modified examples can be partially or completely combined within the scope of and consistent with the technological ideas of the present invention.

Example 1

This embodiment example illustrates a method in which, in a system capable of registering, in a code management tool, source code (hereinafter called code) of software generated using a visual programming tool and of reusing the source code, by linking flow images of code displayed via the visual programming tool to the code and registering the flow images in the management tool, the flow images are applied as information upon selecting reusable code.

<Configuration of Code Management System According to Example 1>

Figure 1:
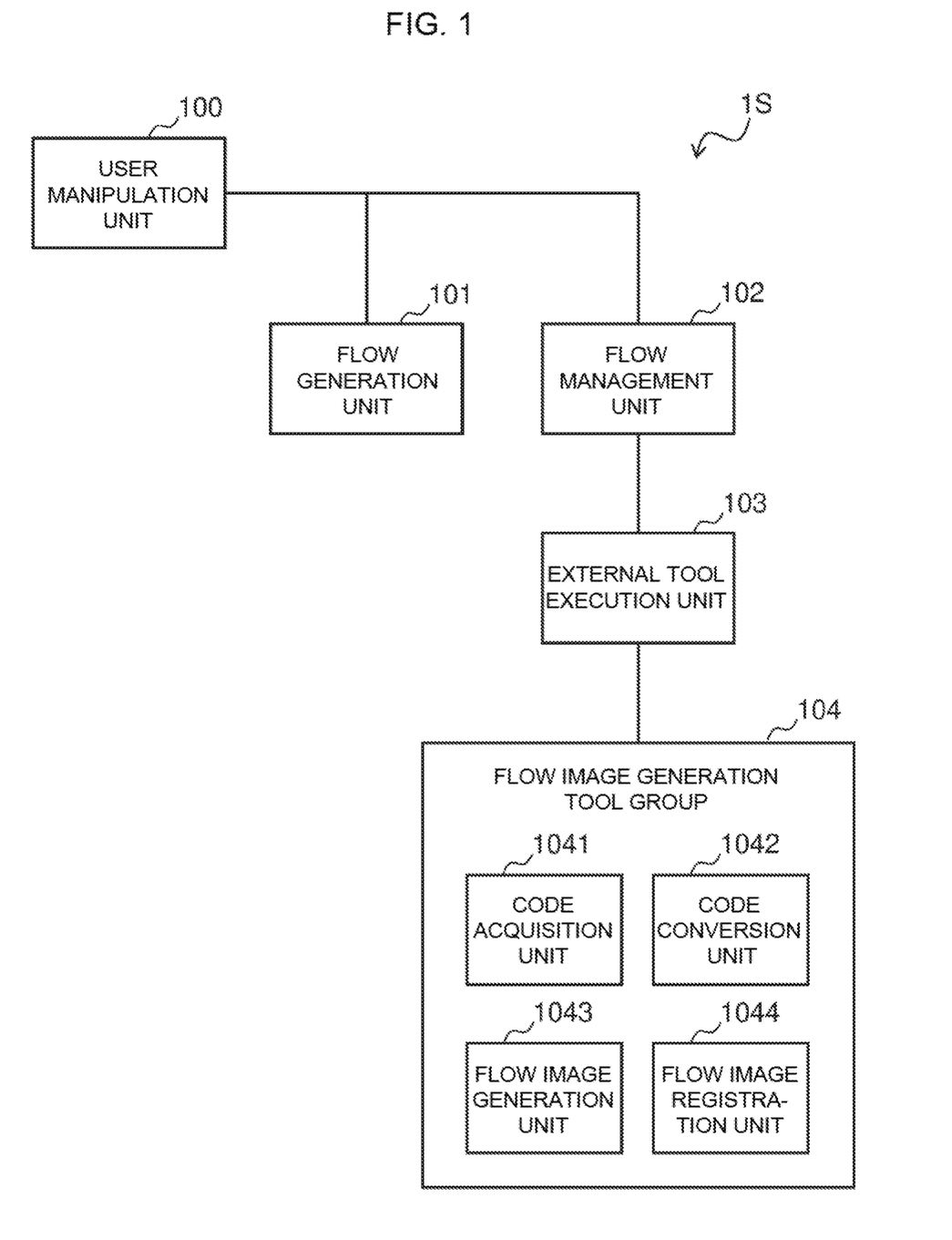
FIG. 1 is a diagram illustrating a configuration example of a code management system according to an Example 1.

First, a configuration example of the code management system according to this embodiment example will be described by using FIG. 1. FIG. 1 is a diagram illustrating a configuration example of the code management system according to Example 1.

As illustrated in FIG. 1, a code management system 1S according to this embodiment example includes a user manipulation unit 100, a flow generation unit 101, a flow management unit 102, an external tool execution unit 103, and a flow image generation tool group 104. In addition, the flow image generation tool group 104 includes a code acquisition unit 1041, a code conversion unit 1042, a flow image generation unit 1043, and a flow image registration unit 1044.

A software developer who is a user of the code management system 1S operates the user manipulation unit 100, accesses the flow generation unit 101, and carries out flow development using a visual programming tool. The software developer registers the flow that has been developed using the flow generation unit 101, in the flow management unit 102.

Note that registration in the flow management unit 102 involves converting the flow, which the software developer has developed via the visual programming tool, to code. Typically, this conversion processing is provided as a function of the visual programming tool.

The software developer operates the user manipulation unit 100 to access the flow management unit 102, reads existing code stored in the flow management unit 102, and captures the existing code in the flow generation unit 101. The code becomes reusable by being captured in the flow generation unit 101.

Note that the code captured in the flow generation unit 101 is converted to a flow by a visual programming tool function. The software developer is able to perform code editing in the form in which the process flow thus converted from code is edited.

Upon detecting that code has been registered in the flow management unit 102, the external tool execution unit 103 acquires a flow image when the code whose registration has been detected is displayed via the visual programming tool, by controlling the flow image generation tool group 104.

More specifically, the external tool execution unit 103 accesses the flow management unit 102 and acquires the code whose registration has been detected by means of the code acquisition unit 1041. The external tool execution unit 103 then converts the acquired code to a flow by means of the code conversion unit 1042. Thereafter, the external tool execution unit 103 generates a flow image of the converted flow by means of the flow image generation unit 1043. Finally, the external tool execution unit 103 registers the generated flow image in the flow management unit 102 by means of the flow image registration unit 1044 by linking the flow image to the corresponding code.

Accordingly, because flow images can be managed by the flow management unit 102 by linking code and flow images when the code is displayed via the visual programming tool, the software developer is able to search for reusable code by referencing the flow images.

Figure 2:
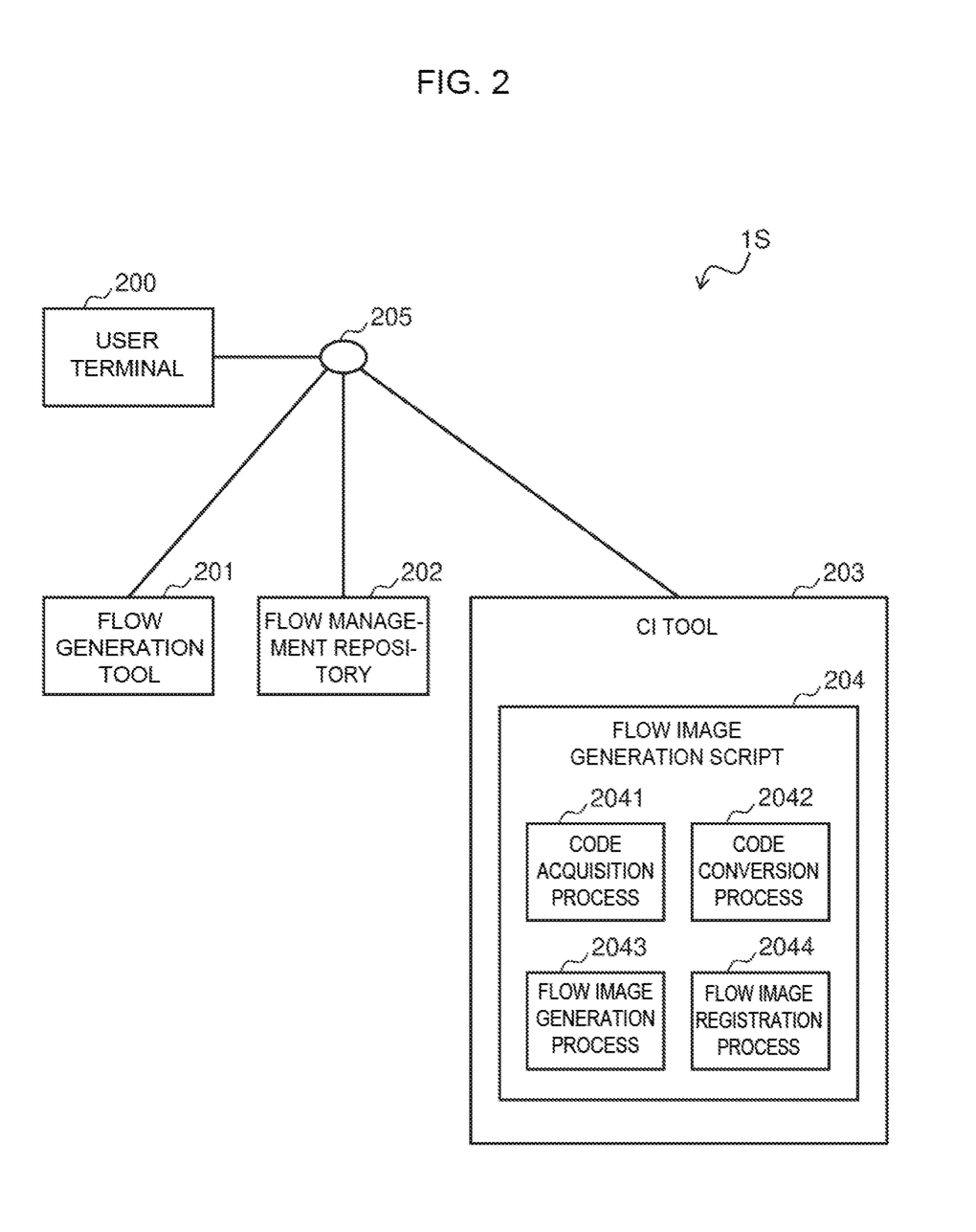
FIG. 2 is a diagram illustrating an example obtained by embodying the configuration of the code management system according to Example 1.

Here, an example obtained by embodying the configuration of the code management system will be described by using FIG. 2. FIG. 2 is a diagram illustrating an example obtained by embodying the configuration of the code management system according to Example 1.

A user terminal 200 corresponds to the user manipulation unit 100 and is a personal computer (PC), for example.

A flow generation tool 201 corresponds to the flow generation unit 101 and is a visual programming tool. In this embodiment example, a description in which the flow generation tool 201 is Node-RED (registered trademark, as hereinbelow) is provided.

A flow management repository 202 corresponds to the flow management unit 102 and is a code management tool. In this embodiment example, a description in which the flow management repository 202 is GitLab (registered trademark, as hereinbelow) is provided.

A CI (Continuous Integration) tool 203 corresponds to the external tool execution unit 103 and is a tool for realizing continuous integration. Typically known CI tools include Jenkins and Drone. A CI tool pre-describes a process that is to be executed as a script and is capable of automating the execution of any process described using script. Note that in terms of the timing for executing a script process, the CI tool 203 is capable of performing configuration using the timing with which a specified event notification is hooked, or with other timing.

The user terminal 200, flow generation tool 201, flow management repository 202, and CI tool 203 are communicably coupled via a network 205. In this embodiment example, the flow generation tool 201, flow management repository 202, and CI tool 203 each run on independent servers but the servers that the flow generation tool 201, flow management repository 202, and CI tool 203 run on may also be suitably distributed or integrated. For example, the flow management repository 202 and CI tool 203 could also run on one server.

A flow image generation script 204 corresponds to the flow image generation tool group 104 and is a group of scripts executed by the CI tool 203. As scripts, a code acquisition process 2041, a code conversion process 2042, a flow image generation process 2043, and a flow image registration process 2044 are provided.

The code acquisition process 2041 corresponds to the code acquisition unit 1041. The code conversion process 2042 corresponds to the code conversion unit 1042. The flow image generation process 2043 corresponds to the flow image generation unit 1043. The flow image registration process 2044 corresponds to the flow image registration unit 1044.

In this embodiment example, in response to (newly created or updated) code registration in the flow management repository 202, the CI tool 203 generates a flow image, based on the code registered in the flow management repository 202 when the code is displayed via the flow generation tool 201, by automatically executing the flow image generation script 204, links the flow image to the code registered in the flow management repository 202, and saves the flow image.

Figure 3:
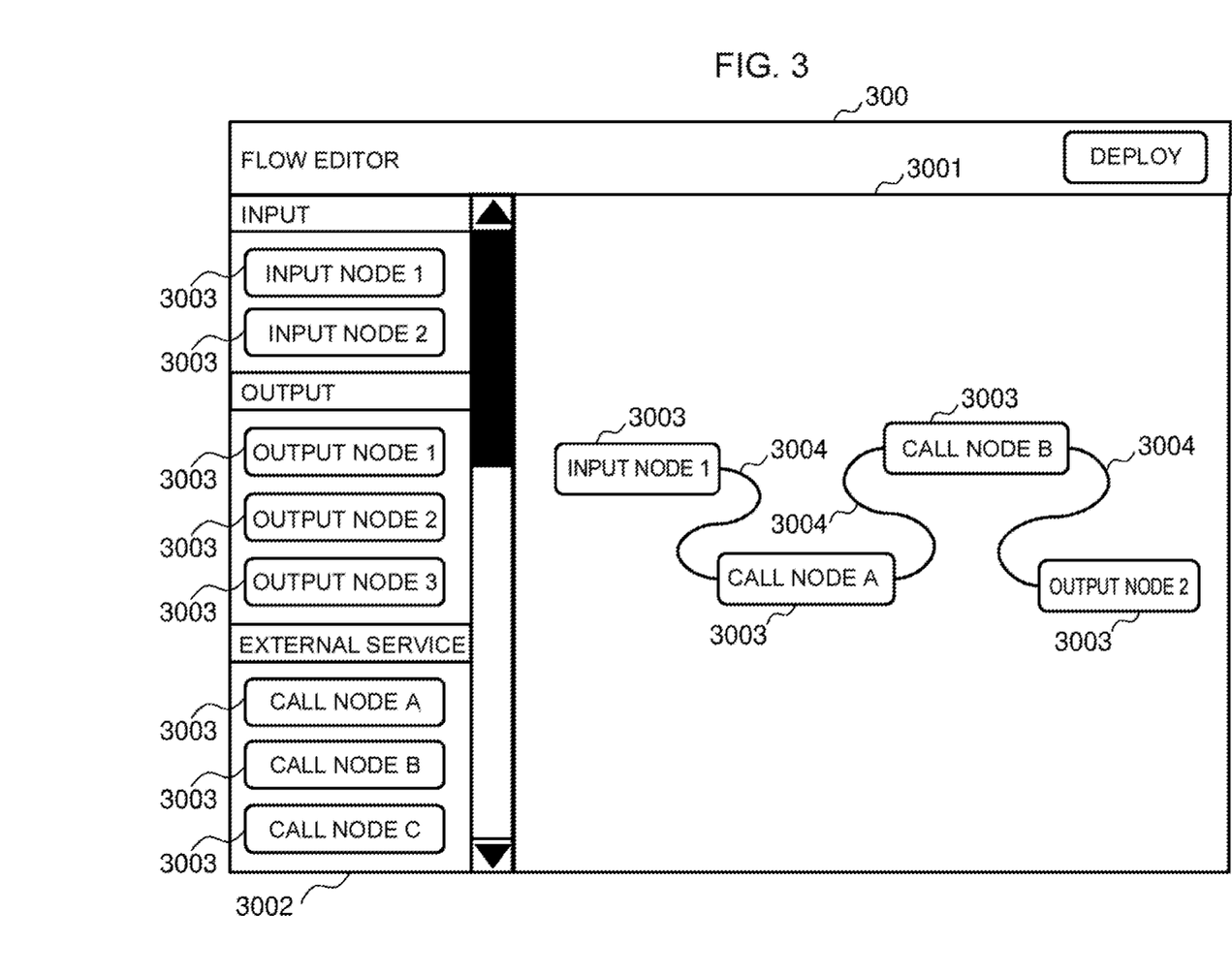
FIG. 3 is a diagram illustrating an example of a visual programming tool screen according to Example 1.

Each tool from which the system is configured will be described next. FIG. 3 is a diagram illustrating an example of a visual programming tool screen according to Example 1. FIG. 3 schematically illustrates an example of the flow generation screen of Node-RED (the flow generation tool 201).

The software developer accesses a flow editor GUI 300 from a web browser running on the user terminal 200, and performs the creation of a process flow using a flow editing screen 3001. Execution programs for various processes are prepared on a palette 3002 as nodes 3003, categorized by functions such as input, output and external service functions.

The software developer is able to use any of the nodes 3003 by dragging and dropping the nodes from the palette 3002 onto the flow editing screen 3001. The software developer is also able to define the processing sequence of the nodes by wiring together the nodes 3003 using wires 3004. In the example of FIG. 3, when the process of a node 3003 (input node 1) ends, the process of node 3003 (call node A) which is wired by a wire 3004 extending from the right side of the node 3003 (input node 1) is executed.

As a result of the software developer pressing a button displayed as "deploy" on the flow editor GUI 300, code is generated from the process flow displayed on the flow editing screen 3001. The generated code can be saved in the flow management repository 202 by means of predetermined manipulation via the flow editing screen 3001.

<Screen Illustrating Code Information of Example 1>

Figure 4:
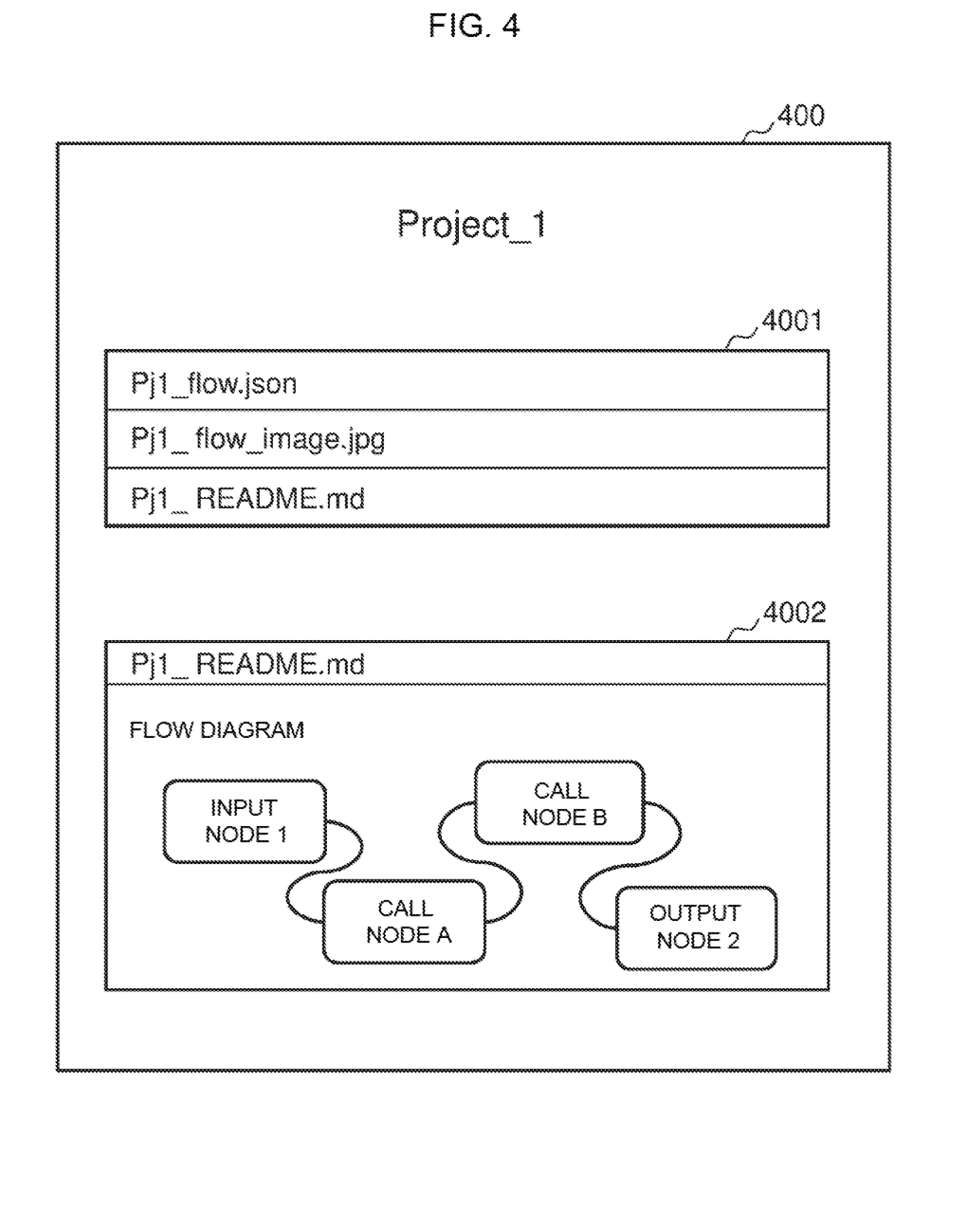
FIG. 4 is a diagram illustrating an example of a screen showing code information registered in a flow management repository according to Example 1.
Figure 5:
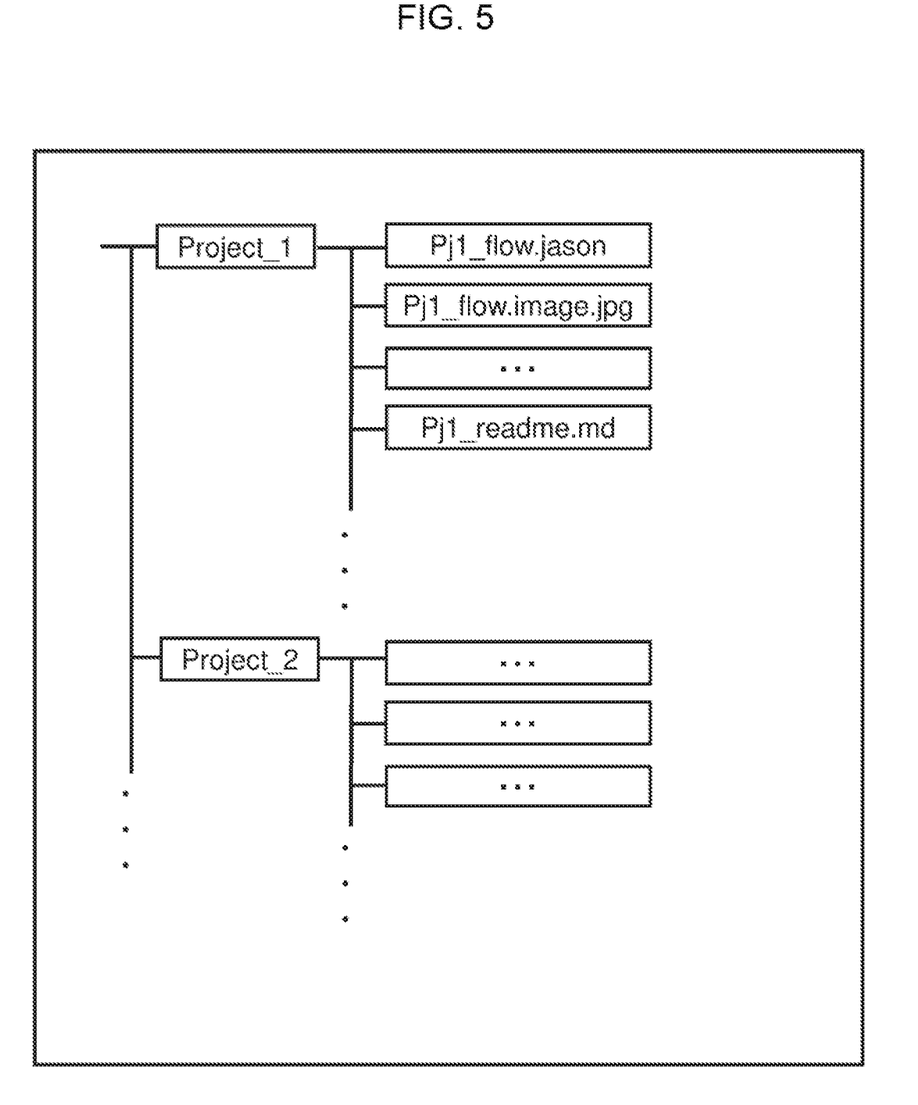
FIG. 5 is a diagram illustrating an example of an aspect in which code information is registered in the flow management repository according to Example 1.

FIG. 4 is a diagram illustrating an example of a screen showing code information registered in the flow management repository according to Example 1. FIG. 4 schematically illustrates an example of a screen showing code information registered in the GitLab (flow management repository 202). FIG. 5 is a diagram illustrating an example of an aspect in which code information is registered in the flow management repository according to Example 1. FIG. 5 illustrates an example of an aspect in which code information is registered in GitLab (the flow management repository 202).

The software developer is able to confirm code that has been registered in the flow management repository 202 by accessing a code management GUI 400 from a web browser running on the user terminal 200. Code management is performed in units called projects in the flow management repository 202. FIG. 4 illustrates an example of a case where information of a project with the name Project_1 is being browsed, and a file list 4001 which belongs to the project is displayed.

FIG. 4 illustrates an example in which three files, namely, flow.json, flow_image.jpg, and README.md have been registered for a project with the project information Project_1. By using a Node-RED project function, flows generated by Node-RED (the flow generation tool 201) are registered as files in JSON format in a code management tool of the flow management repository 202, and the like, such as GitLab which is connected by a network 205. flow.json is an example of such a flow. Furthermore, the flow_image.jpg is an example of a flow image file that is registered so as to be linked to code (flow.json in this embodiment example). Further, README.md is a file in which the project description is recorded and is in a format called markdown.

In GitLab, the information recorded in README.md is displayed as a preview screen 4002. In a markdown file, image files can be embedded in addition to text and text-decoration, and FIG. 4 illustrates an example in which a "flow image" is displayed on the preview screen 4002 by embedding the title text "flow diagram" and flow_image.jpg.

Note that, as illustrated in FIG. 5, in the flow management repository 202, a JSON file corresponding to each project, one or more JPG files, a markdown file, and other files are stored together for each project.

Accordingly, in this embodiment example, the software developer accesses the code management GUI 400, and upon searching for flows (code) they would like to reuse, the software developer displays not only the file list 4001 but also combines flow images when same are displayed as a flows on Node-RED and displays the flow images on the preview screen 4002. Alternatively, the code and corresponding flow images are contrastingly (or simultaneously) displayed on the preview screen 4002. The software developer is thus able to make use of the display of the preview screen 4002 as reference information when searching for reusable flows (code).

<Processes of Code Management System According to Example 1>

Figure 6:
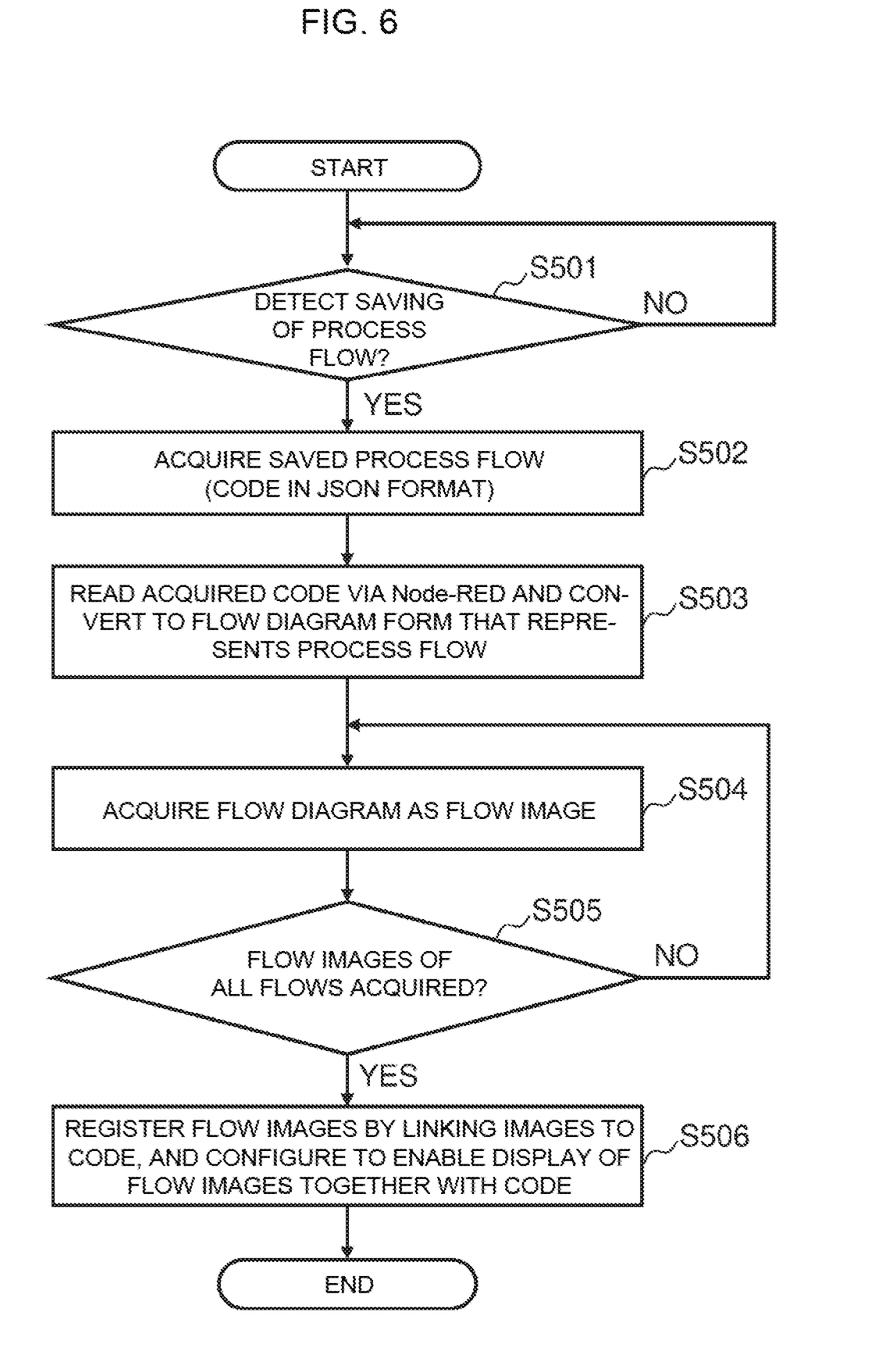
FIG. 6 is an example of a flowchart illustrating a process flow of the code management system according to Example 1.

An example of a process flow of the code management system according to this embodiment example will be illustrated next using the flowchart in FIG. 6. FIG. 6 is an example of a flowchart illustrating a process flow of the code management system according to Example 1. The process of the code management system of Example 1 is executed in response to (newly created or updated) code registration in the flow management repository 202. Although the CI tool 203 is described hereinbelow as executing the process of each step, the CI tool 203 is realized by a CPU that executes scripts, and therefore, in reality, a CPU or a functional part realized by the CPU executes the processing of each step.

First, in step S501, the CI tool 203 determines whether or not it has been detected that the process flow created by the software developer has been saved in the flow management unit 102. For example, GitLab has a function for reporting various events in GitLab; for example, the fact that code has been registered in GitLab can be externally reported by preconfiguring a Webhook function.

When registration of a process flow has been detected (YES in step S501), the CI tool 203 moves processing to step S502, and when registration of a process flow has not been detected (NO in step S501), the CI tool 203 repeats the processing of step S501.

In step S502, the CI tool 203 hooks a user registration notification and, by executing the script of the code acquisition process 2041, acquires a process flow (actually a file in the JSON format) that has been registered in the flow management repository 202 (GitLab).

Thereafter, in step S503, by executing the script of the code conversion process 2042, the CI tool 203 uses the flow generation tool 201 (Node-RED) to read code acquired from the flow management repository 202 (GitLab) and performs conversion to a flow diagram aspect which represents the process flow. The converted flow diagram is displayed on the flow editor GUI 300 of the flow generation tool 201 (Node-RED).

One example of means for realizing the processing of step S503 is illustrated here. Methods for reading code acquired from GitLab via Node-RED include a method in which code is fetched by accessing the flow editor GUI 300 from a web browser and using a Node-RED project function. Meanwhile, the processing by the CI tool 203 is executed in the background irrespective of manipulation by the software developer. A headless browser, which is a browser without a GUI, is therefore utilized. For example, by utilizing a headless mode provided by Google Chrome (registered trademark, as hereinbelow), Node-RED can be accessed from a CLI (Command Line Interface), and code can be converted to a flow diagram aspect by fetching the code via Node-RED.

Thereafter, in step S504, the CI tool 203 acquires, as flow images, a process flow diagram that is displayed on the flow editor GUI 300 of the flow generation tool 201 (Node-RED) by executing the script of the flow image generation process 2043. The processing of step S504 can also be realized by using the headless mode provided by Google Chrome. More specifically, because a command for acquiring a screenshot of the screen has been prepared, the flow displayed on Node-RED can be acquired as an image by executing this command from the CLI.

Note that acquisition of object images such as process flows is not limited to acquiring screenshots on Node-RED.

Figure 7:
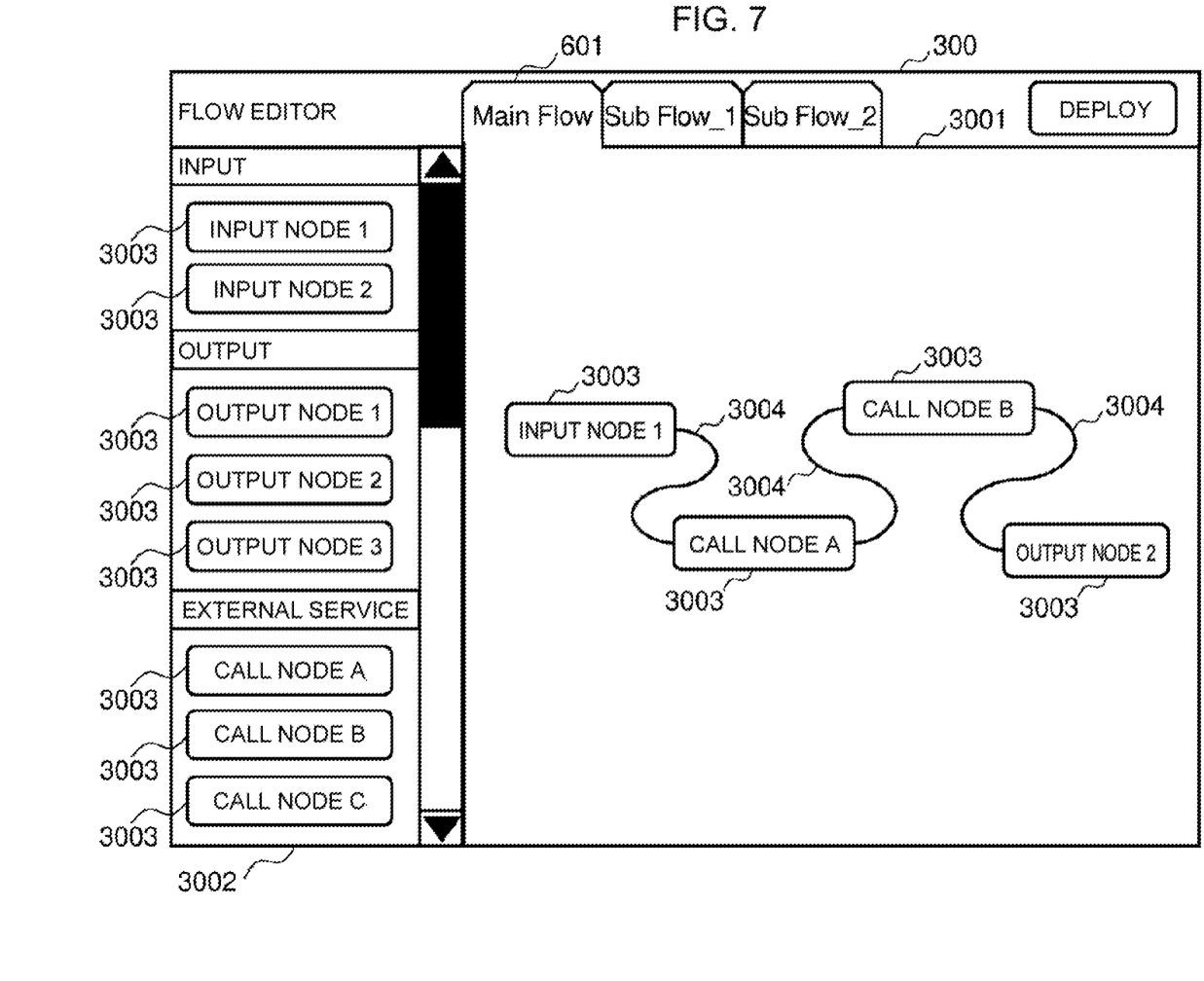
FIG. 7 is a diagram illustrating an example of a visual programming tool screen when a plurality of flows exist, according to Example 1.

Here, an example of a Node-RED screen in a case where a plurality of flows exist when flows are displayed on Node-RED is illustrated in FIG. 7. FIG. 7 is a diagram illustrating an example of a visual programming tool screen when a plurality of flows exist, according to Example 1.

Figure 8:
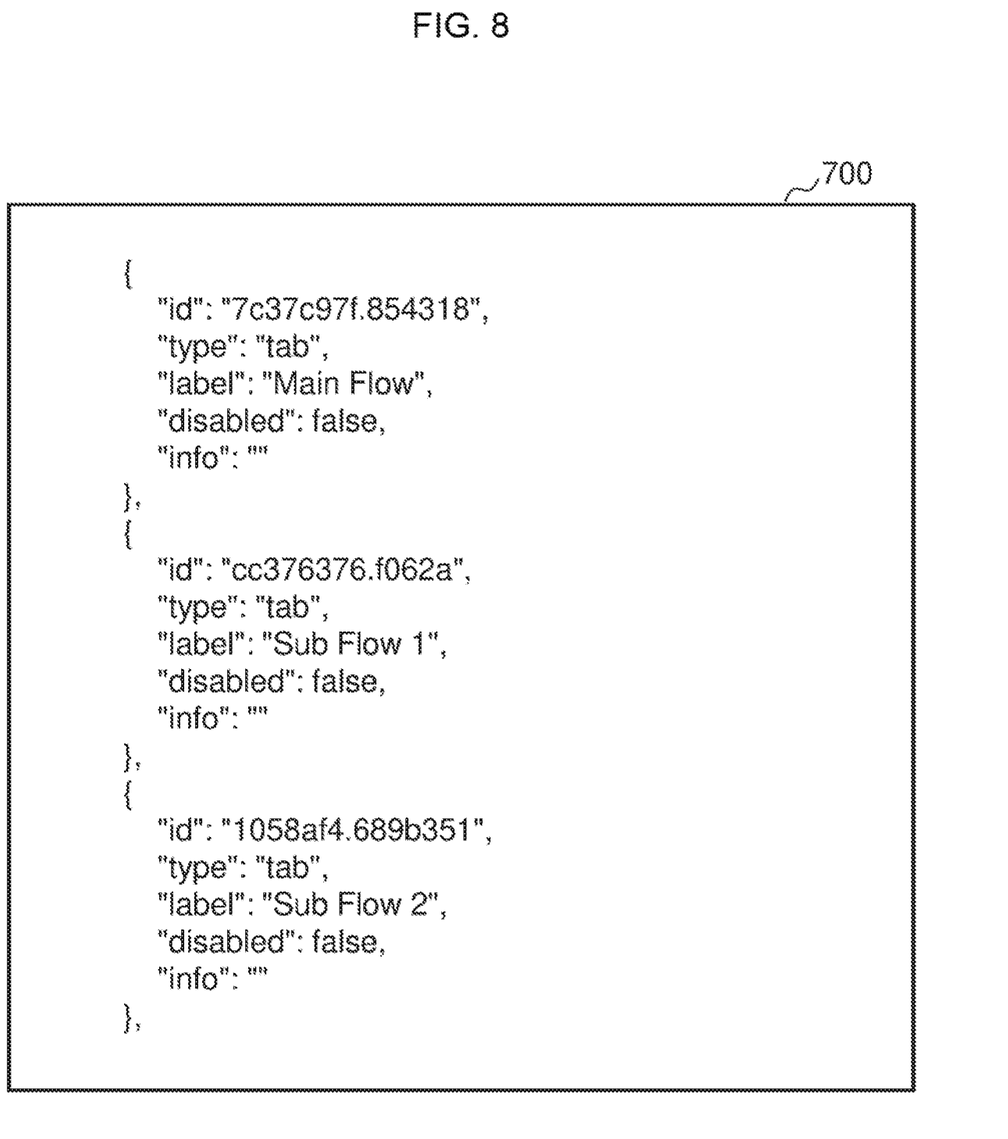
FIG. 8 is a diagram illustrating an example of a portion of code registered in the flow management repository according to Example 1.

As illustrated in FIG. 7, a display enabling switching between a plurality of flows can be configured on the flow editing screen 3001 by means of flow selection tabs 601. Note that information of the flow selection tabs 601 can be acquired by referencing flow source files (JSON files) acquired from GitLab. An example of a portion of code described in a JSON file is illustrated in FIG. 8. FIG. 8 is a diagram illustrating an example of a portion of code registered in the flow management repository according to Example 1.

Definitions of the flow selection tabs 601 are described at the start of the JSON file, and definitions for which the value of an item "type" is "tab" are definitions relating to the flow selection tabs 601. In addition, the values of an item "label" are the names of the flow selection tabs 601. Therefore, by parsing the JSON file descriptions using the foregoing keywords, information regarding the existence of flows whose display is switchable using the flow selection tabs 601 can be acquired. Based on this information, the name of the flow selection tab 601 is designated from the CLI and the displayed flow is switched. Accordingly, by displaying a plurality of flows by switching between the flows in order, a plurality of flows can be acquired as images (steps S504 and S505).

Thereafter, in step S505, the CI tool 203 determines whether or not flow images of all the flows have been acquired. When the flow images of all the flows have been acquired (YES in step S505), the CI tool 203 moves the processing to step S506. When, on the other hand, there are flows for which flow images have not been acquired (NO in step S505), the CI tool 203 moves the processing to step S504.

In step S506, the CI tool 203 executes the script of the flow image registration process 2044 and performs registration of the acquired flow images by linking the flow images to the registered flow source files (JSON files) in the flow management repository 202 (GitLab). In addition, in step S506, the CI tool 203 performs configuration so that the flow images are displayed together with the code on the code management GUI 400.

More specifically, the registration destination of the flow images in the processing of step S506 is the project for which the flow source file (JSON file) has been registered, and the file names of the flow images are made unique within the same project. In addition, by editing README.md, which exists in the same project, and embedding the registered flow images, the flow images are displayed on the preview screen 4002. FIG. 4 illustrated above is an example of a code information display on the code management GUI 400 when the foregoing processing has been carried out.

<Effect of Example 1>

According to this embodiment example, in a system that enables the registration, in a management tool, of software generated using a visual programming tool and which enables reuse of the software, by linking flow images of code displayed via the visual programming tool to the code and registering the flow images in the management tool, the flow images can be applied as information upon selecting reusable code. Consequently, by confirming the flow images, the software developer is able to more easily identify code to be reused even without confirming the content of the code, and is therefore able to perform software development efficiently.

In addition, in this embodiment example, the acquisition and management of flow images of a process flow generated using a visual programming tool is implemented by using the flow generation tool 201 and flow management repository 202 and by executing the CI tool 203 in whose script the intended processes are described. Consequently, the intended functions can be easily achieved by using an existing configuration.

Example 2

Figure 9:
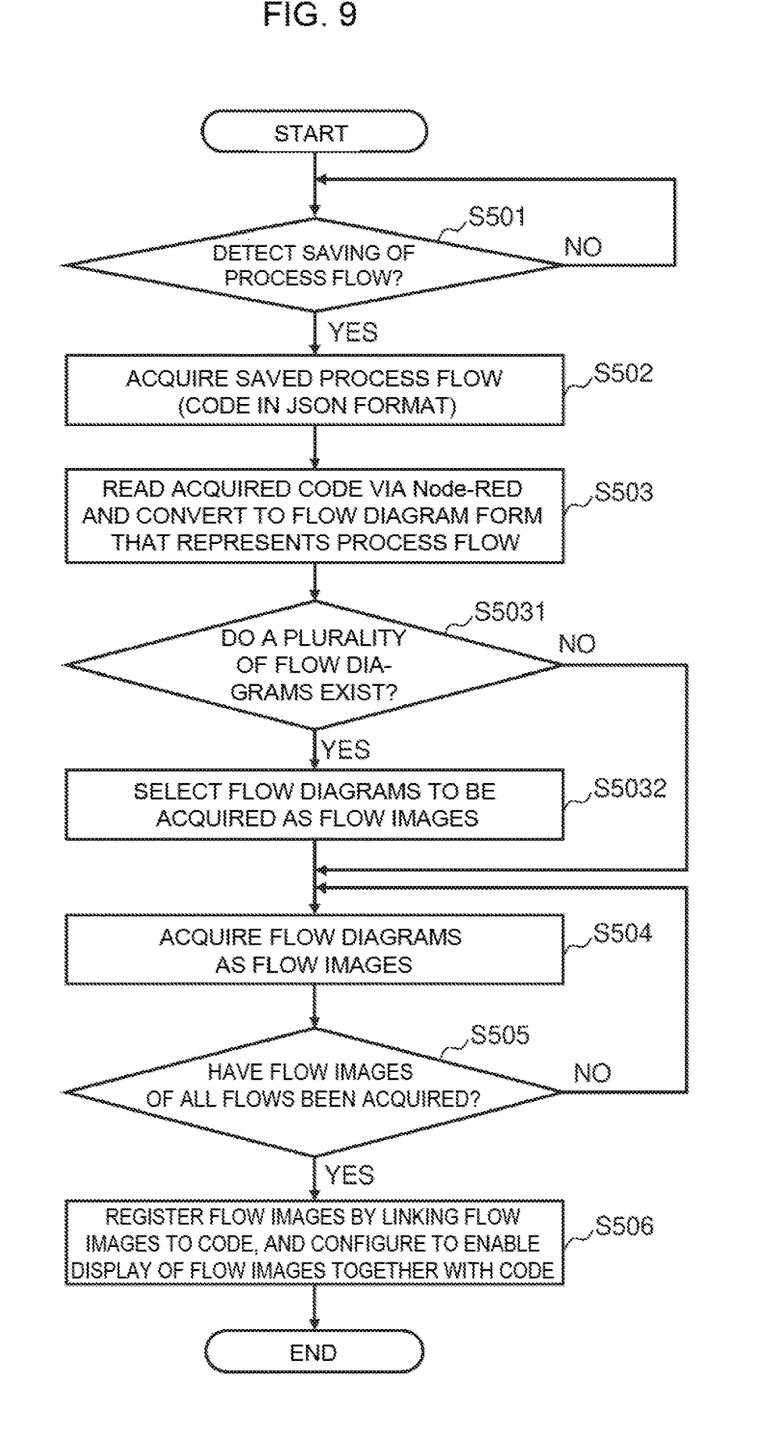
FIG. 9 is an example of a flowchart illustrating a process flow including the selection of flows saved as flow images when a plurality of flows exist, in processing of the code management system according to an Example 2.

As illustrated in FIG. 4, when a plurality of flows exist upon displaying flow images as code supplementary information, sometimes it is desirable to display only a representative flow. For example, there are cases such as those where the flows are nested, and it is desirable to display only a top-level main flow. An Example 2 in which a display of only the top-level main flow is realized is described hereinbelow by using the flowchart in FIG. 9. FIG. 9 is an example of a flowchart showing a process flow including the selection of flows saved as flow images when a plurality of flows exist, in processing of the code management system according to Example 2.

<Processing of Code Management System According to Example 2>

When compared with the processing of the code management system according to Example 1, the processing of the code management system according to Example 2 illustrated in FIG. 9 is the same except for the fact that steps S5031 and S5032 are executed between steps S503 and S504. Descriptions of parts overlapping with the description of the flowchart in FIG. 6 have been omitted from the description of FIG. 9.

In step S5031 which follows on from step S503, the CI tool 203 determines whether or not there are a plurality of flow diagrams that have been converted in step S503. When a plurality of flow diagrams exist (YES in step S5031), the CI tool 203 moves the processing to step S5032. When, on the other hand, only one flow diagram exists (NO in step S5031), the CI tool 203 moves the processing to step S504.

FIG. 7 is an example of a screen of the flow generation tool 201 (Node-RED) when step S5031 yields YES. In this example, it is possible to switch the display between each of the flows by means of a plurality of the flow selection tabs 601. Here, in step S5032, the CI tool 203 selects a flow that is displayed together with the code on the code management GUI 400. For example, by determining a rule whereby the name of the flow selection tab 601 on the flow editing screen in which the top-level main flow is described is "Main Flow", the flow selection tab 601 in which the main flow is described is uniquely determined. By selecting the corresponding flow selection tab 601 and acquiring a screenshot of the screen, the main flow can be acquired as an image (step S504). When there is a flow image other than the main flow that is to be displayed on the code management GUI 400 (NO in step S505), acquisition of the corresponding flow image is performed (step S504). After acquisition of the required flow images is complete (YES in step S505), the CI tool 203 executes the script of the flow image registration process 2044, performs registration of the acquired flow images by linking the flow images to the flow source files (JSON files) registered in GitLab and performs configuration so that the flow images are displayed together with the code on the code management GUI 400 (step S506).

<Effect of Example 2>

According to this embodiment example, because flow images registered in the flow management repository 202 (GitLab) can be selected, it is possible to display only a representative flow image on the code management GUI 400 as code supplementary information, and the convenience of the overall view of process flows improves. For example, the software developer is able to view all the software based on a representative flow image and suitably and efficiently select the code to be reused.

Example 3

Figure 10:
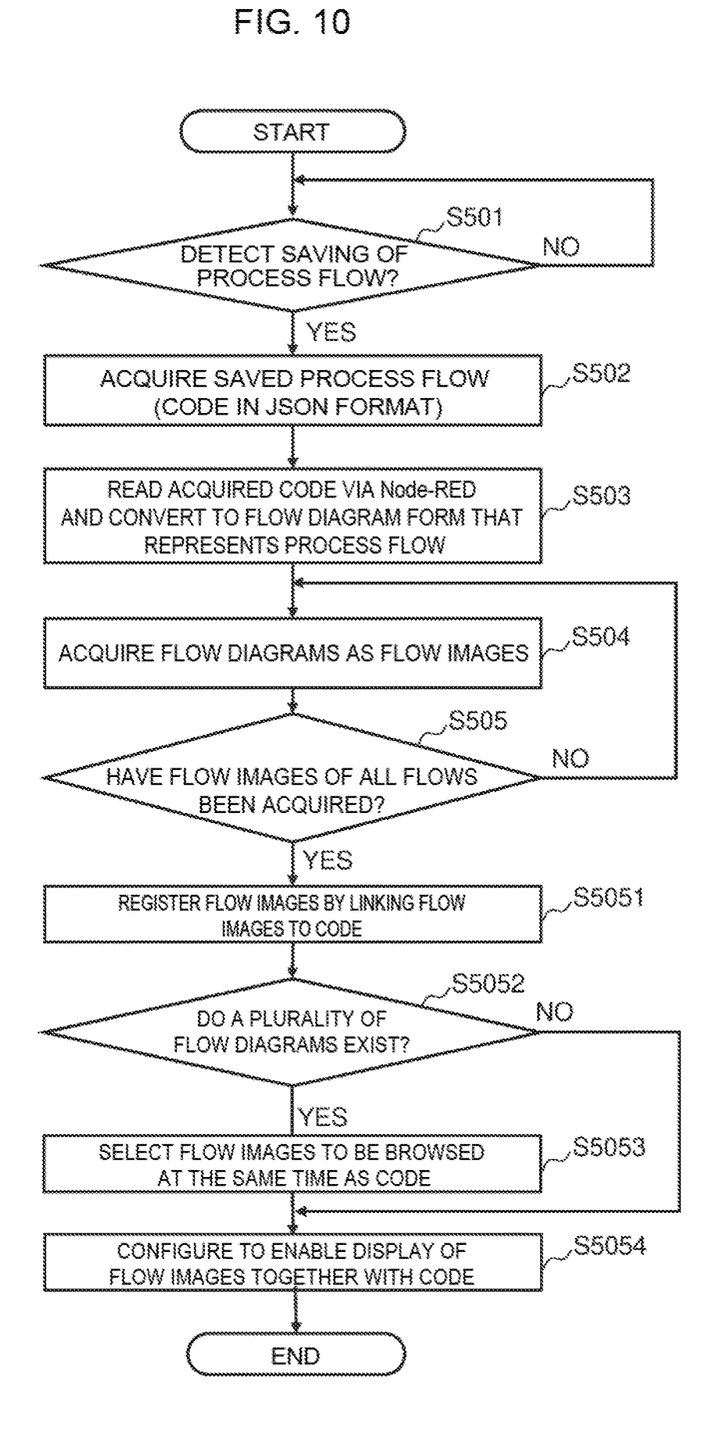
FIG. 10 is a diagram illustrating an example of a flowchart illustrating a process flow including the selection of flow images displayed together with code when a plurality of flow images exist in the flow management repository, in processing of the code management system according to an Example 3.

Means for displaying only a representative flow image as code supplementary information is not limited to a method, as illustrated in the flowchart in FIG. 9 of Example 2, where a target flow is selected in the step following step S503 in which flow image screenshots are acquired. Another method for selecting a target flow will be described hereinbelow as an Example 3, using the flowchart in FIG. 10. FIG. 10 is a diagram illustrating an example of a flowchart showing a process flow including the selection of flow images displayed together with code when a plurality of flow images exist in the flow management repository, in processing of the code management system according to Example 3.

<Processes of Code Management System According to Example 3>

When compared with the processing of the code management system according to Example 1, the processing of the code management system according to Example 3 illustrated in FIG. 10 is the same except for the fact that steps S5051 to S5054 are executed after step S505 and the processing of the code management system ends with the end of step S5054. Descriptions of parts which overlap with the description of the flowchart in FIG. 6 have been omitted from the description of FIG. 10.

In step S504, the CI tool 203 acquires, as images, the flows displayed on Node-RED by executing the script of the flow image generation process 2043. As illustrated in FIG. 7, when a plurality of flows exist upon displaying flows on Node-RED, the plurality of flows are displayed by being switched in order using the flow selection tabs 601, and all flows are acquired as images (steps S504 and S505). In step S5051, which follows next when all flow images have been acquired (YES in step S505), the CI tool 203 executes the script of the flow image registration process 2044 after the flow image acquisition in step S505 is complete, and performs registration of the acquired flow images by linking the flow images to the registered flow source files (JSON files) in the flow management repository 202 (GitLab).

More specifically, the registration destination of the flow images in the processing of step S5051 is the project for which the flow source file (JSON file) has been registered. In addition, the names of the flow images that are registered are the names of the flow selection tabs 601 which are selected when the flows images are acquired. For example, in the case of the Node-RED screen illustrated in FIG. 7, three flow selection tabs 601, namely, "Main Flow," "Sub Flow1," and "Sub Flow2" exist, and the names of the flow images acquired when these tabs are each selected are "Main Flow.jpg," "Sub Flow1.jpg," and "Sub Flow2.jpg," respectively.

Thereafter in step S5052, the CI tool 203 determines whether or not a plurality of flow images have been registered in step S5051. When a plurality of flow images have been registered in step S5051 (YES in step S5052), the CI tool 203 moves the processing to step S5053. When, on the other hand, only one flow image has been registered in step S5051 (NO in S5052), the CI tool 203 moves the processing to step S5054.

In step S5053, the CI tool 203 selects a flow that is displayed together with the code on the code management GUI 400. For example, when only the top-level main flow is selected, an image with the name "Main Flow" may be selected from among the plurality of flow images registered in GitLab.

In step S5054, the CI tool 203 performs configuration so that the flow images are displayed together with the code on the code management GUI 400. When step S5053 ends, the CI tool 203 ends the processing of the code management system of Example 3.

<Effect of Example 3>

According to this embodiment example, because flow images to be registered in the flow management repository 202 (GitLab) can be selected, it is possible to display only a representative flow image on the code management GUI 400 as code supplementary information, and the convenience of the overall view of the process flow improves. In addition, when there are a plurality of acquired flows, because the flow image to be displayed at the same time as the code is selected after acquiring flow images of all the flow diagrams, the flow image to be displayed at the same time as the code can also be switched simply by changing the display configuration of step S5054. Because flow images of all the flow diagrams are acquired, upon confirming the main process flow, for example, the user is able to display and confirm the intended flow image even when a more detailed sub-process flow is to be confirmed.

Example 4

Each of the configurations, functions, processing units, and processing means and so forth of the foregoing Examples 1 to 3 may also be implemented by software as a result of a processor interpreting and executing a program which implements the respective functions. The information of the programs, tables, files and the like realizing each of the functions can be placed in storage units such as memory, hard disks and SSD (Solid State Drives), or on recording media such as IC cards, SD cards, DVD (Digital Video Disks), and BD (Blu-ray (registered trademark) Disks). An Example 4, in which the code management system is implemented by software, will be described hereinbelow.
<Computer Realizing a Code Management System According to Example 4>

Figure 11:
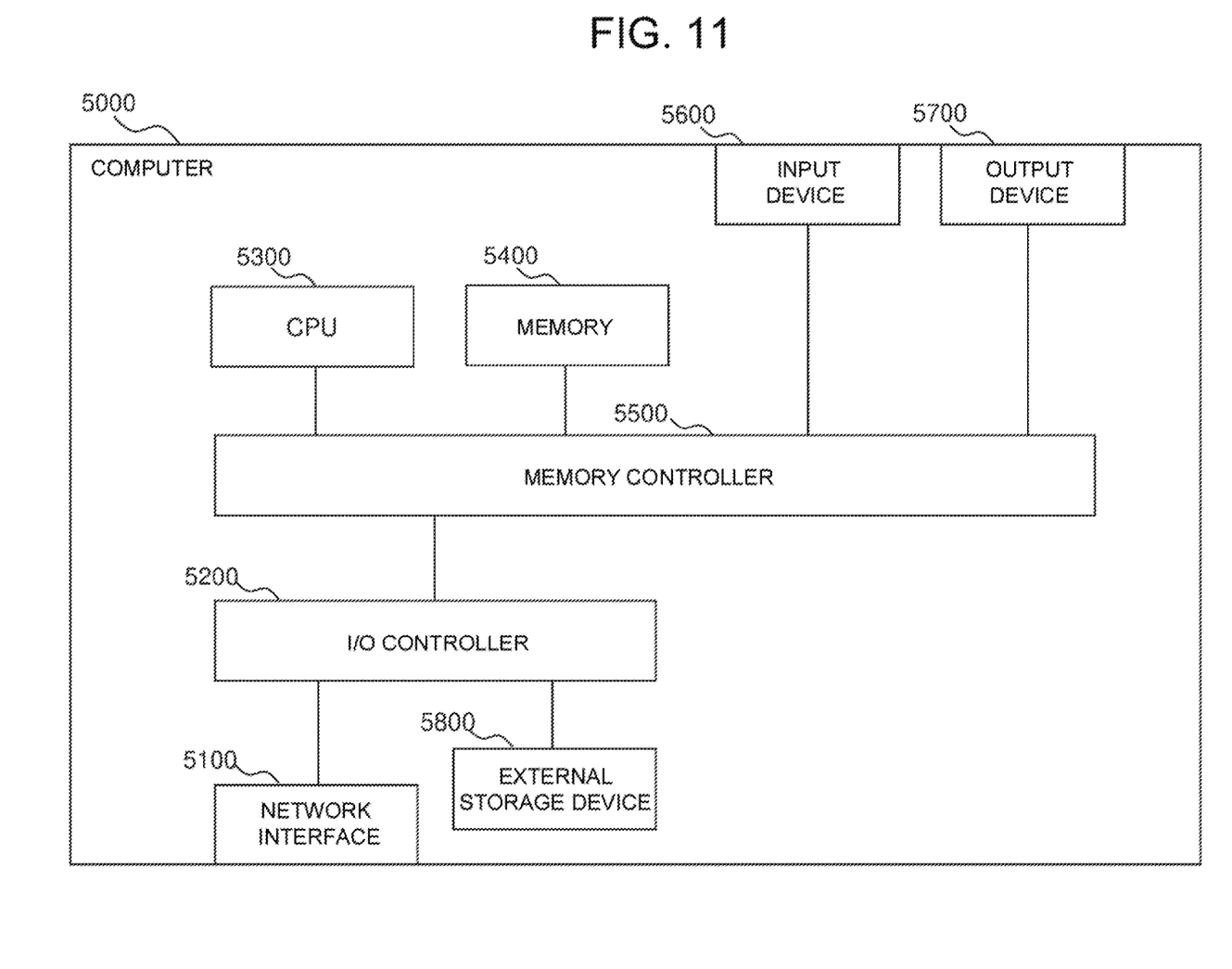
FIG. 11 is a diagram illustrating an example of a computer that realizes a code management system according to an Example 4.

FIG. 11 is a diagram illustrating an example of a computer that realizes a code management system according to Example 4. In the computer 5000, an arithmetic processing unit 5300 which is represented by a CPU (Central Processing Unit), a memory 5400 such as a RAM (Random Access Memory), an input device 5600 (for example, a keyboard, a mouse, a touch panel or another device), and an output device 5700 (for example, a video graphics card which is coupled to an external display monitor) are coupled to one another via a main controller 5500.

Each of the programs realizing the user terminal 200, flow generation tool 201, flow management repository 202, and CI tool 203 of the code management system 1S are read from an external storage device 5800 such as an SSD or HDD via an I/O (Input/Output) controller 5200 and executed through cooperation between the CPU 5300 and memory 5400.

Alternatively, each of the programs for realizing the user terminal 200, flow generation tool 201, flow management repository 202, and CI tool 203 of the code management system 1S may also be acquired from an external computer through communication via a network interface 5100.

Moreover, each of the configurations, functions, processing units, and processing means and so forth of the foregoing Examples 1 to 3 may also be realized by means of hardware by designing a portion or all thereof by means of an integrated circuit, for example.

Other Embodiment Examples

Note that, as described earlier, the servers on which the flow generation tool 201, flow management repository 202, and CI tool 203 run may each be an independent server or servers that are suitably distributed or integrated.

That is, an example obtained by embodying the configurations of the code management systems according to Examples 1 to 3 is illustrated in FIG. 2. In the description thereof, it is assumed that the flow generation tool 201, flow management repository 202, and CI tool 203 each run on independent servers but all or a portion thereof may also be configured to run on the same server. In addition, although a configuration in which the flow management repository 202 (GitLab) and CI tool 203 are divided is illustrated, by additionally installing a tool known as GitLab CI on GitLab, CI execution on GitLab is then possible, and therefore GitLab may also be configured to incorporate a CI tool.

In addition, the flow image generation script 204 is shown to consist of the code acquisition process 2041, code conversion process 2042, flow image generation process 2043, and flow image registration process 2044, but these scripts need not be separate, rather, all or a portion of the scripts may be described collectively in one script.

In addition, in the foregoing Examples 1 to 3, an example is illustrated in which, in response to code being saved in a code management tool, the code is converted to a process flow diagram and the process flow diagram is generated, but there are no limitations on the timing for generating a process flow diagram. For example, a configuration in which a process flow diagram is generated when the code information is displayed in the code management tool is also possible. Furthermore, for the generation of process flow diagrams, a code management tool may be embodied, or a display tool such as a browser that presents code management tool information to a user may be embodied.

Moreover, in the foregoing Examples 1 to 3, an example is illustrated in which flow images are displayed as code supplementary information on the GitLab screen, but a configuration in which the flow images are displayed on another code management tool such as GitHub is also possible. Furthermore, the configuration is not limited to a code management tool, rather, a configuration in which the flow images are displayed on a tool screen with a function for presenting the code information being managed is also possible. Furthermore, the flow images illustrated in the foregoing embodiment examples are screenshot images of process flow diagrams displayed on Node-RED, but the configuration may be such that UML diagrams or the like that have been generated using PlantUML, which enables the generation of UML (Unified Modeling Language) from code, are saved as images and managed together with the code.

The present invention is not limited to or by the foregoing embodiment examples and encompasses a variety of modified examples. For example, the foregoing embodiment examples have been described in detail in order to provide an explanation that facilitates understanding of the present invention, but the present invention is not necessarily limited to embodiment examples that comprise all the configurations described. Furthermore, a portion of the configuration of a certain embodiment example can be replaced by the configuration of another embodiment example, and the configuration of another embodiment example can be added to the configuration of a certain embodiment example. Moreover, a portion of the configuration of each embodiment example can have other configurations added thereto or can be removed or replaced.

Moreover, control lines and information lines and the like as deemed necessary for the description are shown in the foregoing embodiment examples but not all the control lines and information lines in a product are necessarily shown. In reality, almost all the configurations may be regarded as being coupled to one another.

REFERENCE SIGNS LIST

1S: code management system
100: user manipulation unit
101: flow generation unit
102: flow management unit
103: external tool execution unit
104: flow image generation tool group
200: user terminal
201: flow generation tool
202: flow management repository
203: CI tool
204: flow image generation script
300: flow editor GUI
400: code management GUI
601: flow selection tab
1041: code acquisition unit
1042: code conversion unit
1043: flow image generation unit
1044: flow image registration unit
2041: code acquisition process
2042: code conversion process
2043: flow image generation process
2044: flow image registration process
3001: flow editing screen
3002: palette
3003: node
3004: wire
4001: file list
4002: preview screen
5000: computer
5100: network interface
5200: computer
5300: arithmetic processing unit
5400: memory
5500: memory controller
5600: input device
5700: output device
5800: external storage device.

The invention claimed is:

1. A code management system including a visual programming tool that creates a process flow by wiring together nodes representing processes, comprising:
a flow generation unit that creates a process flow based on user manipulation of the visual programming tool and generates code based on the created process flow;
a flow management unit that saves the code generated by the flow generation unit;
a code acquisition unit that acquires the code in response to the code being saved in the flow management unit;
a code conversion unit that converts the code acquired by the code acquisition unit to a process flow diagram;
a flow image generation unit that generates a flow image of the process flow diagram converted by the code conversion unit; and
a flow image registration unit that registers the flow image of the process flow diagram generated by the flow image generation unit, in the flow management unit in association with the code prior to conversion of the code to the process flow diagram by the code conversion unit.

2. The code management system according to claim 1, further comprising: an execution unit that executes scripts, wherein content of each process of the code acquisition unit, the code conversion unit, the flow image generation unit, and the flow image registration unit is described by scripts, and
wherein, upon detecting that the code has been saved in the flow management unit, the execution unit executes each of the scripts of the code acquisition unit, the code conversion unit, the flow image generation unit, and the flow image registration unit.

3. The code management system according to claim 1, wherein, when a plurality of process flow diagrams exist as a result of converting the code to the process flow diagram being performed by the code conversion unit, a process flow diagram that registers a flow image in the flow management unit in association with the code is selected based on information in the code.

4. The code management system according to claim 1, wherein, when a plurality of flow images which are managed by the flow management unit in association with the code exist, a process flow image displayed together with the code is selected based on information in the code.

5. The code management system according to claim 4, wherein the code, and the plurality of flow images which are managed by the flow management unit in association with the code, are displayed contrastingly on a display device.

6. A code management method of a code management system including a visual programming tool that creates a process flow by wiring together nodes representing processes, comprising:
a process in which a flow generation unit of the code management system creates a process flow based on user manipulation of the visual programming tool and generates code based on the created process flow;
a process in which a flow management unit of the code management system saves the code generated by the flow generation unit;
a process in which a code acquisition unit of the code management system acquires the code in response to the code being saved in the flow management unit;
a process in which a code conversion unit of the code management system converts the code acquired by the code acquisition unit to a process flow diagram;
a process in which a flow image generation unit of the code management system generates a flow image of the process flow diagram converted by the code conversion unit; and
a process in which a flow image registration unit of the code management system registers the flow image of the process flow diagram generated by the flow image generation unit, in the flow management unit in association with the code prior to conversion of the code to the process flow diagram by the code conversion unit.

* * * * *